United States Patent [19]
Weatherly et al.

[11] Patent Number: 6,049,784
[45] Date of Patent: Apr. 11, 2000

[54] METHOD FOR CREATING AND MANAGING A LEASE AGREEMENT

[75] Inventors: James E. Weatherly, Fairfax County, Va.; Charles R. Carey, Montgomery County, Md.

[73] Assignee: Capital One Financial Corporation, Glen Allen, Va.

[21] Appl. No.: 08/991,112

[22] Filed: Dec. 16, 1997

[51] Int. Cl.[7] .................................................. G06F 17/60
[52] U.S. Cl. .................................. 705/38; 705/1; 705/39
[58] Field of Search ................................. 705/35, 38, 39, 705/40, 1, 4

[56] References Cited

U.S. PATENT DOCUMENTS

| | | |
|---|---|---|
| 4,774,664 | 9/1988 | Campbell . |
| 4,891,503 | 1/1990 | Jewell . |
| 5,025,138 | 6/1991 | Cuervo . |
| 5,239,462 | 8/1993 | Jones . |
| 5,262,941 | 11/1993 | Saladin . |
| 5,274,547 | 12/1993 | Zoffel . |
| 5,283,829 | 2/1994 | Anderson .................................. 380/24 |
| 5,383,113 | 1/1995 | Kight . |
| 5,583,760 | 12/1996 | Klesse . |
| 5,611,052 | 3/1997 | Dykstra . |
| 5,649,117 | 7/1997 | Landry .................................... 395/240 |
| 5,696,907 | 12/1997 | Tom ........................................ 395/238 |
| 5,732,400 | 3/1998 | Mandler et al. .......................... 705/26 |
| 5,774,882 | 6/1998 | Keen et al. ............................... 705/38 |

OTHER PUBLICATIONS

Tarnoff, Stephen, "Judge's Ruling Widens Fiduciary Responsibility of Ceding Companies", Business Insurance, vol. 21, No. 46, p. 31 (start page), Nov. 1997.

Tarnoff, Stephen, "Insurers Guaranteeing Lease Payments", Business Insurance, vol. 18, No. 20, p. 36 (start page), May 1984.

Wollard, David A., "Lease Guarantee Insurance —Aid to Small Businessmen", Mortgage Banker, vol. 34, No. 2, p. 18 (start page), Nov. 1973.

Starr, John O., "Lease Guarantee Insurance", The Appraisal Journal, vol. 40, No. 2, p. 175 (start page), Apr. 1972.

John C. Murray, "Off–balance–sheet financing: Synthetic leases", Real Property Probate & Trust Journal, v32, No.2, pp. 193–253, Sum. '97.

John Downes and Jordan Elliot Goodman, Dictionary of Finance and Investment Terms (4th ed.), p. 166, 1995.

*Primary Examiner*—Allen R. MacDonald
*Assistant Examiner*—Susanna Meinecke-Díaz
*Attorney, Agent, or Firm*—J. Michael Martinez de Andino; McGuire, Woods, Battle & Boothe, LLP

[57] ABSTRACT

A method for creating and managing a lease agreement includes providing predetermined financial information regarding a potential tenant and a potential landlord to a lease control intermediary, evaluating the information to determine the acceptability of the financial risk associated with the potential tenant, creating a service product in the form of a guaranty directed to periodic lease payments from the lease control intermediary to the landlord for a predetermined amount defining a guaranty limit with the guaranty limit corresponding to a predetermined time period with the guaranty obligation becoming active upon failure of the potential lessee to pay periodic lease payments; providing a lease agreement for execution by the landlord and tenant and the lease control intermediary and depositing periodic lease payments received either from the tenant or made by the lease control intermediary according to the service product into an account held by the landlord, the payments having a management fee removed therefrom by the lease control intermediary.

38 Claims, 3 Drawing Sheets

METHOD FOR CREATING AND MANAGING A LEASE AGREEMENT

BACKGROUND OF THE INVENTION

The present invention relates broadly to methods for property transactions and, more particularly, to a method for creating and managing a lease agreement wherein a third party provides lease management and payment guaranties.

Traditionally, leases of property, for example leases for houses or apartments, involve a lessor and a lessee and, more particularly, a landlord and a tenant. In creating the lease relationship and lease agreement, the landlord will typically require background information from the prospective tenant to include various types of financial information, e.g. employment information and current income. Although recommended, a credit check through an authorized credit agency may not be conducted, depending on the landlord. This is especially true with property holdings often units or less. Typically, these landlords may have different professions and do not make their living from leasehold interests in their property. Such landlords may lack the time or expertise to fully monitor the financial condition of their rented property with precision and regularity.

In addition, personal dealings between the landlord and tenant may give rise to the opportunity for an unscrupulous tenant to take advantage of a landlord's good nature, resulting in consistently delayed rent payments or, in extreme cases, the total absence of rent payments.

Some landlords turn to property management companies, yet these companies can be expensive and there are no assurances that rent will be paid to the landlord when it is due. These property management companies may lack the resources and expertise to provide assurances that landlord will receive timely and complete rent payments. Perhaps more importantly, the management companies are under no obligation to assure landlords that they will receive the rent due.

Accordingly, there exists a need for a leasehold arrangement and method for managing the leasehold arrangement that will provide the landlord with assurances that the rent will be received in a timely manner.

SUMMARY OF THE INVENTION

It is accordingly an object of the present invention to provide a method for creating and managing a lease arrangement wherein the landlord is assured of rent payments being deposited in a landlord account in a timely manner.

It is another object of the present invention to provide such a method that will guarantee the landlord will receive a minimum number of rent payments or a minimum monetary amount.

It is another object of the present invention to provide financial institutions with a heretofore unknown service product which will generate fees for the financial institution as well as providing guarantees to landlords making use of the service product.

To those ends, a method for creating and managing a lease agreement includes the steps of providing first predetermined information regarding a potential lessee and a potential lessor to a lease control intermediary; evaluating the first predetermined information by the lease control intermediary to determine the acceptability of the level of financial risk associated with the potential lessee; creating, upon determination of an acceptable risk level, a service product in the form of a guaranty directed to periodic lease payments from the lease control intermediary to the lessor for a predetermined amount defining a guaranty limit, the guaranty limit corresponding to a predetermined time period with the guaranty obligation becoming active upon failure of the potential lessee to pay periodic lease payments; providing, upon determination of an acceptable risk level, a lease agreement for execution by the potential lessor, the potential lessee, and the lease control intermediary and periodic lease payment material to the lessee directing payment of periodic lease payments to the lease control intermediary whereby, upon execution of the lease agreement, the potential lessee and the potential lessor become lessee and lessor, and the lease control intermediary becomes a guarantor of the lease payments; and depositing periodic lease payments either received from the lessee or made by the lease control intermediary according to the service product into an account held by the lessor, the periodic lease payment having a management fee removed therefrom by the lease control intermediary.

Preferably, the method for creating and managing a lease agreement includes the step of entering data relevant to the lessee, the lessor, the lease agreement and the service product into a computer preprogrammed for account control. It is further preferred that the present invention include the step, to be performed upon acceptance of the service product by the lessor and the lease agreement by the lessee and the lessor, as well as the lease control intermediary, of monitoring periodic lease payment activity by the lessee using the computer to determine whether periodic lease payment has been made by a predetermined date.

It is preferred that the step of monitoring includes, upon nonreceipt of the periodic lease payment by the predetermined date, adding uncollected periodic lease payments to a total amount of outstanding debt for the account of the lessee, and comparing the amount of outstanding debt to the predetermined guaranty limit to determine whether the amount of outstanding debt exceeds the predetermined guaranty limit. Further, the method preferably includes the steps of paying the lessor an amount in accordance with the service product in initiating collection procedures to recover the amount of the outstanding debt.

The method further preferably includes the steps of obtaining a security deposit from the lessee upon execution of the lease agreement and applying the amount of the security deposit to offset any outstanding debt associated with the lessee.

It is further preferred that the step of evaluating the first predetermined information includes determining whether more than one potential lessee exists for a proposed lease using the computer and, if more than one potential lessee exists, storing the first predetermined information for all potential lessees by the computer until all potential lessees have submitted the predetermined information; comparing the predetermined information from all potential lessees to a credit allocation model resident in the computer resulting in a collective credit assessment; determining the guaranty limit based on the collective credit assessment; and preparing the service product with a guaranty limit. Similarly, in the case of one lessee, the step of evaluating the predetermined information includes comparing the predetermined information from the potential lessee to a credit allocation model resident in the computer resulting in a credit assessment determining the guaranty limit based on the credit assessment and preparing the service product with the guaranty limit.

It is further preferred that the method include the steps of determining whether the credit assessment results in a determined guaranty limit sufficiently low to be declined and, if so, issuing a letter from the computer to the lessee indicating that lease control intermediary declined to offer a guaranty to the lessor.

Preferably, the method further includes the step of electing, by the lessor, whether the periodic lease payments should be deposited directly into a bank account of the lessor and, if so, the method further includes the step of creating an automatic periodic lease deposit account in a computer, and the step of depositing periodic lease payments includes automatically crediting the automatic lease deposit account with an amount in accordance with the periodic lease payments less the management fee.

It is further preferred that the step of monitoring periodic lease payment activity includes entering account information regarding the lessee, the lessor, the lease agreement and the service product into a computer; noting dates associated with actual payments and expected payments; designating accounts with payments past due for five days; generating and sending letters to the lessor and the lessee indicating that the full periodic lease payment was not received; and continuing to monitor the account, all performed by the computer. It is further preferred that the step of monitoring further includes the steps of determining whether a payment has been received within ten days following the five day past due date and, if the payment is received, updating the account to reflect payment received and, if no payment is received, generating and sending a second letter to the lessee; and initiating a collection process. The step of monitoring preferably further includes the step of determining whether payment has been made by the next due date, and, if no payment has been received, comparing an amount of outstanding debt to the guaranty limit, and, if the outstanding debt amount exceeds the product limit, crediting the amount equal to the security deposit to the lessor; closing the account, with no farther automatic deposits being made; and generating and sending a letter to the lessor indicating that the limit has been achieved. Preferably, the step of monitoring further includes the steps of, upon a determination that the limit has not be exceeded, and the outstanding debt has not been paid within five days of the next due date, assessing by the computer a late fee to the account and generating and sending letters to the lessor and the lessee or otherwise prompting notification.

The above description of the present invention is suitable for use with any leasehold arrangement regardless of the property involved. It is preferred that, in another embodiment of the present invention, the lessor be a landlord and the lessee be a tenant and the lease payments be rent payments. This embodiment of the invention is particularly useful for housing arrangements such as rental apartments and rental houses.

DESCRIPTION OF THE PREFERRED EMBODIMENT

According to the preferred embodiment of the method of the present invention, the method for creating and managing a lease agreement assures landlords that at least a portion of the rent payment will be received prior to a tenant moving onto the property. At the outset, it should be understood that while the following discussion of the detailed description of the present invention is directed to land holdings, particularly apartments and houses which constitute rental units, the present invention has far reaching applications. For example, in the transportation area, tractor trailer leasing can be performed according to the present invention. Similarly, other leasing arrangements can benefit from the application of the method of the present invention.

Figure 1:
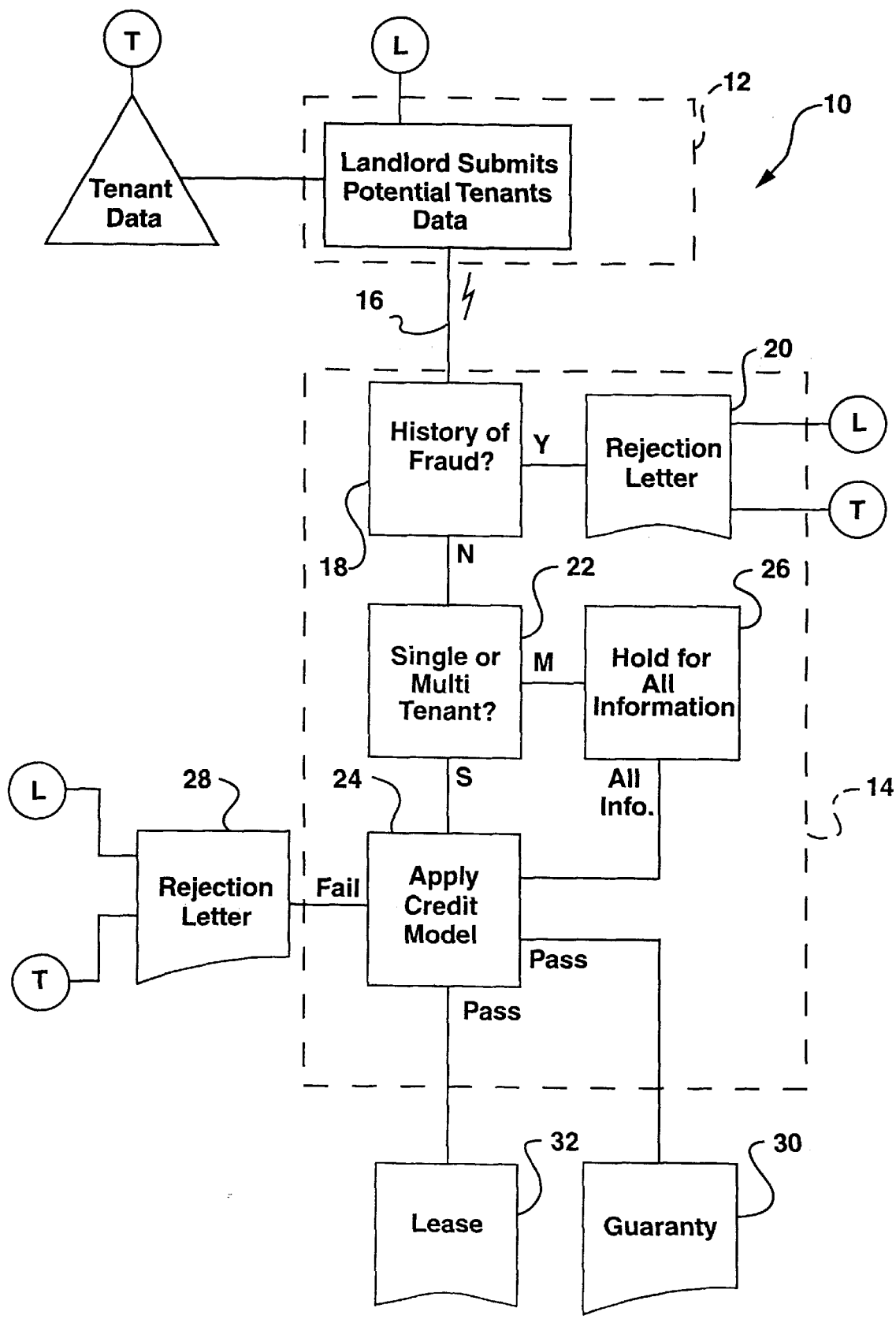
FIG. 1 is a block diagram illustrating the first portion of a method for creating and managing a lease agreement according to the preferred embodiment of the present invention.

With reference to FIG. 1, the present method begins with the creation of a prospective landlord/prospective tenant relationship and the financial evaluation of the prospective tenant At the outset, the lease control intermediary may initiate an advertising campaign to attract landlords to the new service product. A method for creating and managing lease agreement is illustrated in flowchart form generally at 10 and includes, preferably, a lease management computer 14 and a landlord computer 12. The computers may be electronically linked using an electronic telecommunications link 16. Once a relationship is formed, a landlord with a prospective tenant will contact the lease control intermediary, which is preferably a financial institution, and give information on the tenant application required by the financial institution. Once this information is provided, the landlord L verifies that the tenant T has signed the application and authorized the financial institution to review the prospective tenant's history. Typically, an application fee will be associated with this process, to be paid by the tenant T. The tenant T will also provide the financial institution with the required information to perform a credit check and other financial information as necessary, including employer and income information.

The financial institution will then implement a credit check process which will initially check for any indications of fraud attached to the prospective tenant's credit bureau report, the process being illustrated. If the computer detects any indication of fraud, the computer system 10 will deny the tenant's request and generate an adverse action letter 20 to be sent to the prospective tenant and will also notify the landlord L that the service product, namely, the guaranty 30, has been denied. If there are no indications of fraud, the computer system will check the information to determine whether there are multiple tenant applications for the rental property. In the case of a single tenant, the system will apply the credit model to the prospective tenant's application to determine which service product the financial institution will offer the tenant. If there are multiple tenant applications for the unit, the system will determine whether all financial information has been provided for each tenant T, illustrated at 26 and will store the information on hand until it has been determined that all tenant information has been provided illustrated at. Once the information is available, the computer system will apply the multiple tenant credit model to the group of applications to determine which product the financial institution will offer to the tenants. If the comparison with the credit model, which is a computerized data grouping indicative of an ideal applicant, results in declining the applicants, the computer will generate an adverse action letter 28 to the tenant, explaining the reasons they were declined. Once the comparisons of the proposed tenant information with the credit models have occurred, the landlord L will be notified which product the financial institution is able to offer and will request authorization to implement the product.

The service product is in the form of a guaranty agreement 30 wherein the financial institution agrees to provide the landlord with at least three months or, in the case of a high risk product, a one month guaranty of rent payment regardless of the actions of the tenant or tenants. If the landlord L accepts the product, the lease agreement 32 is initiated, the guaranty 30 is activated, and an account (not shown in FIG.1) for the landlord L and tenant T is set up on the computer system 10 which will track the flow of payments from the tenant T to the financial institution and from the financial institution to the landlord L.

Once the landlord L has accepted both the tenant and the service product, an automated computer system will monitor the activity relating to the lease agreement and the service product for lease control and management.

Figure 2:
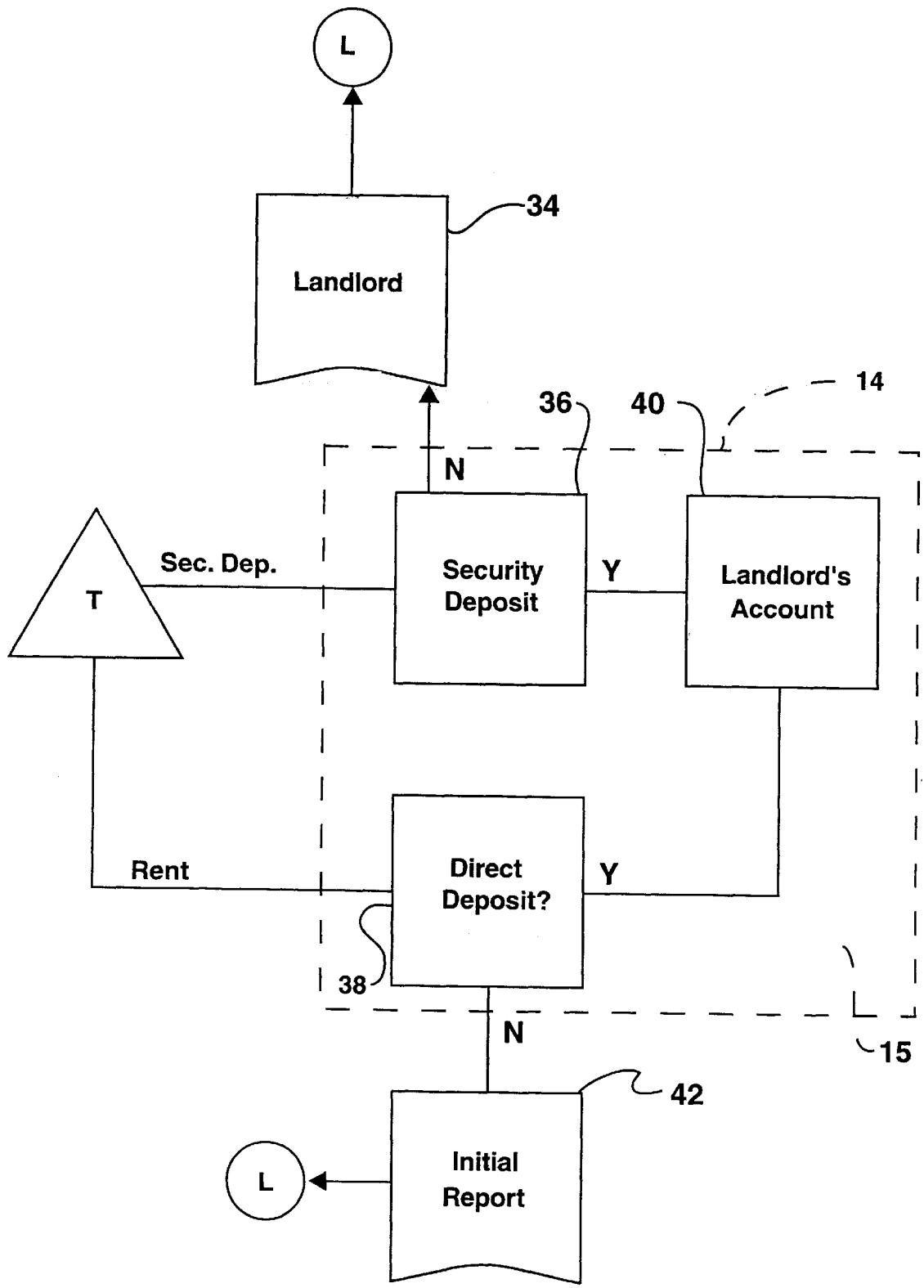
FIG. 2 is a block diagram of a second portion of the method illustrated in FIG. 1.

Turning now to FIG. 2, the Landlord L has the option of requesting funds through direct deposit, and, if such a request is made, an account 40 for the landlord is set up in the proper data base to automatically credit the landlord's account 40 for the rent amount minus the management fee on the same day each month. If the landlord L declines a direct deposit, this is noted in the computer's payment processing system 15. This information will be double checked against the lease and service product, and the security deposit and rent checks are logged into the payment processing computer system 15 and deposited by a remittance processing group. The lease control computer 14 will determine whether the full security deposit has been provided, illustrated at 36. If this has not been done, the landlord L will be notified and the account will not be activated until the full security deposit has been received. If the landlord has requested for a deposit, this account will be blocked from receiving payments until the full security deposit has been received.

If the landlord L has not requested direct deposit, i.e. has requested to be paid by check, the payment processing computer system 15 will generate an invoice 42 for the amount due to the landlord L each month so that the landlord L will receive the check on or before the day the rent is due. The financial institution will produce and send the checks to the landlord L. Monthly reports are also generated detailing the payments made to the landlord with the reports, also referenced at 42, being reconciled monthly. If the landlord L has chosen direct deposit, the direct deposit system will scan all accounts in the data base each night to look for accounts whose due date is the next day. The system checks to see if the account has a closed account indicator and, if so, the system skips that account and will not make any payment until the account is opened once again.

The system will then scan all accounts that are not closed and create a file of all accounts that should be paid that day including the amount to be paid. The computer system 10 will reformat the file to meet any requirements of any electronic deposit system 10 of any bank that the financial institution uses for direct deposits. At the proper time, the file is electronically transferred to the bank that the financial institution uses for direct deposits and landlord payments are transferred from the financial institution accounts to the landlord accounts. Once again, monthly reports are generated and the accounts 40 are reconciled monthly.

Figure 3:
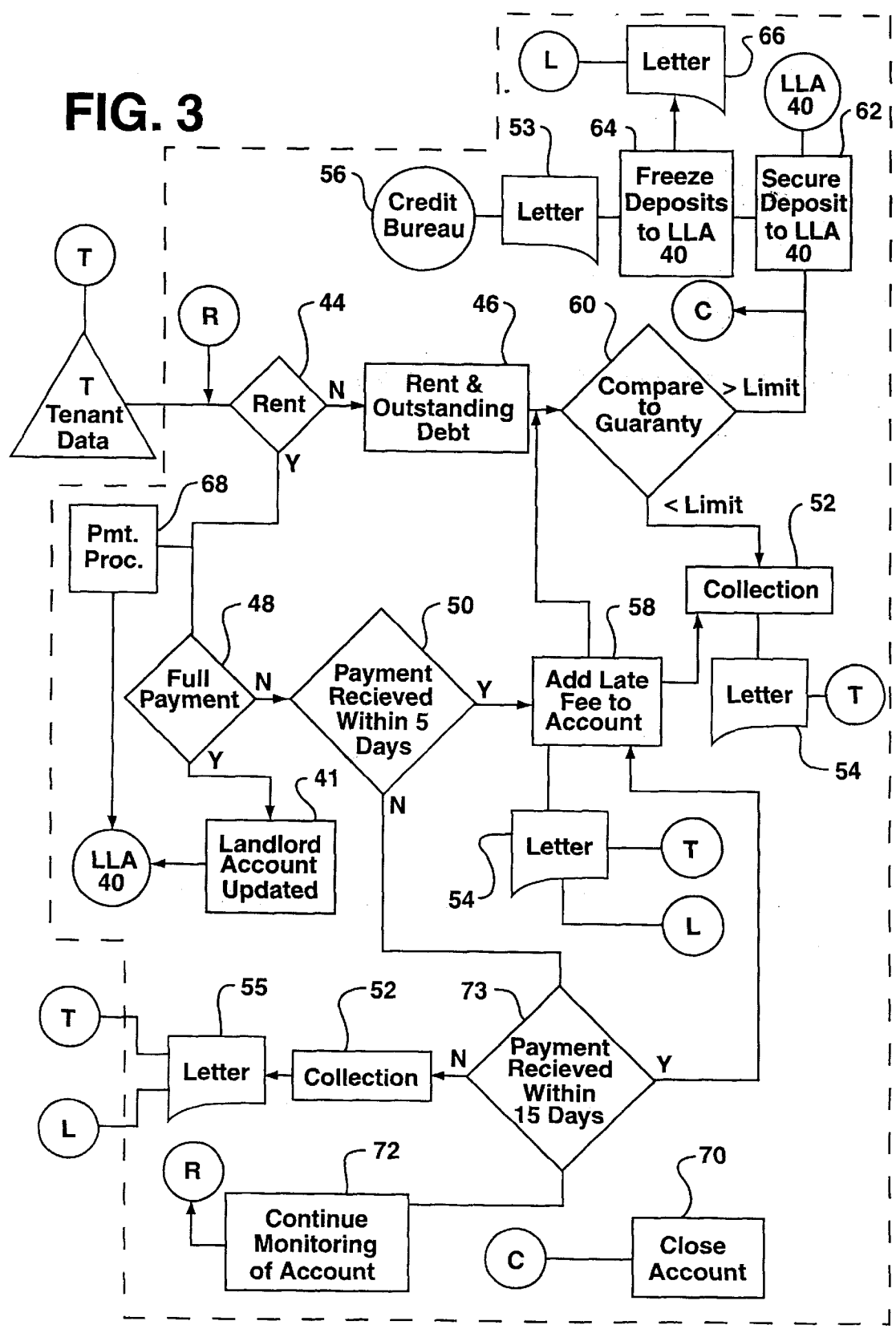
FIG. 3 is a block diagram of a third portion of the system illustrated in FIG. 1.

Referring now to FIG. 3, with respect to the tenant, the financial institution should receive the monthly rent payment and the lease control computer 14 queries whether this has occurred, as illustrated at 44. If the payment is not received, the computer system adds the amount due for the rent and the total amount of outstanding debt for the tenant account. The computer system will automatically assess a late fee to the account and add that amount to the total outstanding debt of the tenant's account. The computer system 10 will then compare the total amount of outstanding debt 46 to the product limit, or guaranty limit for the tenant's account, illustrated at 60. If the total amount of outstanding debt does not exceed the guaranty limit, the account is forwarded to collections 52. If the amount of outstanding debt exceeds the limit for the account, the system credits the funds which were being held by the financial institution as a security deposit for the landlord to the account 40 to offset the losses, illustrated at 60. The system will update the automatic deposit accounts so that no additional payments will be made to the landlord L for the tenant's account. The computer system 10 will generate and send a letter 66 to the landlord L explaining that the limit for the product has been reached and the account has been closed, therein detailing all of the transaction information for the account. The date of the letter is recorded by the computer system. The computer system will also generate notification 56 to credit bureaus that the tenant T or tenants have defaulted on the debt so that the credit reports can be updated. The computer system will then change the status of the account from active to default and forward the account information to the proper group within the financial institution to initiate collection activity.

If the tenant T pays the rent, the rent check is processed and the payment amount and property to which the payment is to be applied, as well as the date and time the payment was received, are entered into the payment processing system where the checks are batched and deposited, as illustrated at 68. The computer will compare the amount received to the total amount due. If the payment is full for the rent, then the system classifies the account as current, illustrated at 41 and a reconciliation report is generated for the total amount of rent received. If the amount is less than the total amount due, and the grace period of five days passed the due date has passed, the system assesses a late fee to the account and adds that amount to the outstanding debt of the account illustrated at 58. The lease control computer 14 will also generate a letter to the tenant informing the tenant T that the full amount of the rent was not received, that a late fee has been assessed, and reminding them of the total amount outstanding for their account. The system will also generate a letter to the landlord L informing them that the tenant T did not fully pay. The system will then record the date the letters were sent. Once again, the system 10 will compare the total amount of outstanding debt to the product limit for that specific account. If the total amount of outstanding debt does not exceed the limit, then the account is forwarded to collections and a collection process, illustrated at 58 is initiated. If the amount of outstanding debt exceeds the limit for the account, the system credits the funds which were being held by the financial institution as a security deposit for the landlord L to the account to offset the loss. Once again, the computer system will then close the account, illustrated at 70, generate a letter 66 to the landlord L explaining that the guaranty limit has been reached, the account has been closed and details of all of the transaction information for the account are provided. The system 10 will also generate notification to the credit bureaus that the tenant T or tenants have defaulted on the debt so that the credit reports can be updated accordingly. Again, the computer system will change the status of the account from active to default and forward the account information to the proper group to initiate collection procedures.

Information on all accounts delinquent five days after the due date for rent is subject to collection procedure 58 and the system 10 will update the accounts to delinquent status from current. The system will check to see if initial letters have been sent to the landlord and tenant or tenants to inform them that the account is delinquent. If the letters have not been sent, the system generates a letter 54 to the tenant T informing them that the fall amount of their rent was not received, that a late fee has been assessed and informing them of the total amount outstanding on their account. Once again, the computer will generate a letter to the landlord L informing him that the tenant T did not fully pay. The system will monitor whether any payments are made to the account within the next ten days, thusly being fifteen days illustrated at 73 beyond the due date. If payments are received, the system compares the amount received to the amount due and if the payment matches or exceeds the amount due, minus the late fee, the system generates a letter to the landlord L informing the landlord that the tenant T or tenants are not current. The system records the date the letter was sent and updates the account information to reclassify the account as current.

If payment is not received within the next ten days, i.e. fifteen days after the due date, or the payment received is less than the amount due, a second delinquency letter, illustrated at 55 to the tenant T is provided by the system and another notification to the landlord L is also provided by the system. The computer system records the date of the letters and also notifies the collections group to initiate collection procedures, illustrated at 52. The system continues to monitor the account, illustrated at 72 regarding whether any payments are made thereto. If, by the next rental due date, full payment has been received for the outstanding debt, then the system generates another letter to the landlord L informing the landlord that the tenant T is current. The system will record when the letter was dispatched. Once again, the system will update and reclassify the account as current. If the full debt has not been paid by the next rental due date, the system compares the outstanding debt to the guaranty limit for the account, illustrated at 60. If the amount of outstanding debt exceeds the limit for the account, the system credits the funds from the security deposit to the account to offset the loss and updates the automatic deposit system, if in place, so that no additional payments will be made to the landlord automatically on the account. Once again, the system 10 will generate a letter 66 to the landlord L explaining that the guaranty limit has been reached and the account has been closed, illustrated at 70 detailing all of the transaction information for that account. Once again, the date of the letter is recorded by the system 10. Again, the system 10 will also notify the credit bureaus of the defaulted debt so that credit reports associated with the tenant or tenants can be updated accordingly. The computer system 10 changes the account status from active to default and then forwards the account information to the proper group for collections.

If the guaranty limit has not been exceeded, and the tenant T has not paid off the outstanding debt within five days of the next rent due date, the computer system 10 will assess a late fee to the account and add that amount to the total outstanding debt of the account. The system will also generate a letter 54 to the tenant T informing them that the full amount of the rent was not received, that a late fee has been assessed, and informing them of the total amount of outstanding debt remaining on the account. The computer system 10 will then generate a letter 66 to the landlord L informing the landlord that the tenant T did not fully pay and record the date on which these letters were sent. Once again, a collections process 52 would be initiated. The computer system 10 will continually monitor the status of the account, whether payments are received, and directing the collections process until the account becomes current or is closed.

As can be seen from the detailed description above, the method of the present invention is essentially computer driven once the agreements have been executed and the accounts set up. Prior to setting up any accounts, the financial institution, having the incentive to generate accounts which operate according to the method of the present invention, can monitor classified advertisements for properties and can initiate advertising and direct calling procedures to recruit landlords and tenants for the system. Therefore, the present invention provides a new and unique product which may be offered by financial institutions which will benefit every party involved.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A computer-implemented method for creating and managing a lease agreement comprising the steps of:

provided predetermined information regarding a potential lessee and a potential lessor to a lease control intermediary;

evaluating said predetermined information by said lease control intermediary to determine an acceptability of a level of financial risk associated with said potential lessee;

creating, upon determination of an acceptable risk level, a service product in the form of a guaranty directed to periodic lease payments from said lease control intermediary to said potential for a predetermined amount defining a guaranty limit, said guaranty limit corresponding to a predetermined time period with said guaranty obligation becoming active upon failure of said potential lessee to pay periodic lease payments;

providing, upon determination of an acceptable risk level, a lease agreement for execution by said potential lessor, said potential lessee and said lease control intermediary and periodic lease payment material to said potential lessee directing payment of periodic lease payments to said lease control intermediary whereby, upon execution of said lease agreement, said potential lessee and said potential lessor become lessee and lessor, and said lease control intermediary becoming a guarantor of the lease payments; and depositing periodic lease payments either received from said lessee or made by said lease control intermediary according to said service product into an account held by said lessor, said periodic lease payments having a management fee removed therefrom by said lease control intermediary.

2. A method for creating and managing a lease agreement according to claim 1 and further comprising the step of entering data relevant to said lessee, said lessor, said lease agreement and said service product into a computer preprogrammed for account control.

3. A method for creating and managing a lease agreement according to claim 2 and further comprising the step, to be performed upon acceptance of said service product by said lessor and said lease agreement by said lessor, said lessee and said lease control intermediary, of monitoring periodic lease payment activity by said lessee using said computer to determine whether periodic lease payment has been made by a predetermined date.

4. A method for creating and managing a lease agreement according to claim 3 wherein said monitoring step includes, upon nonreceipt of said periodic lease payment by said predetermined date, adding uncollected periodic lease payments to a total amount of outstanding debt for an account of said lessee, and comparing said amount of outstanding debt to said predetermined guaranty limit to determine whether said amount of outstanding debt exceeds said predetermined guaranty limit.

5. A method for creating and managing a lease agreement according to claim 4 and further comprising the step of paying said lessor an amount in accordance with said service product and initiating collection procedures to recover the amount of said outstanding debt from said lessee.

6. A method for creating and managing a lease agreement according to claim 4 and further comprising the steps of obtaining a security deposit from said lessee upon execution of said lease agreement and applying the amount of said security deposit to offset any outstanding debt associated with said lessee.

7. A method for creating and managing a lease agreement according to claim 2 wherein the step of evaluating said predetermined information includes determining whether more than one potential lessee exists for a proposed lease using said computer and if more than one potential lessee exists, storing said predetermined information for all potential lessees by said computer until all potential lessees have submitted said predetermined information; comparing said predetermined information from all potential lessees to a credit allocation model resident in said computer resulting in a collective credit assessment; determining said guaranty limit based on said collective credit assessment; and preparing said service product with said guaranty limit.

8. A method for creating and managing a lease agreement according to claim 2 wherein said step of evaluating said predetermined information includes comparing said predetermined information from said potential lessee to a credit allocation model resident in said computer resulting in a credit assessment; determining said guaranty limit based on said credit assessment and preparing said service product with said guaranty limit.

9. A method for creating and managing a lease agreement according to claim 8 and further comprising the steps of determining whether said credit assessment results in declining an applicant, and, if so, issuing a letter from said computer to said potential lessee indicating that the lease control intermediary declined to offer a guaranty to the potential lessor.

10. A method for creating and managing a lease agreement according to claim 1 and further comprising the step of electing, by said lessor, whether said periodic lease payments should be directly deposited into a bank account of said lessor, and, if so, said method further includes the step of creating an automatic periodic lease deposit account in a computer, and the step of depositing periodic lease payments includes automatically crediting said automatic periodic lease deposit account with an amount in accordance with said periodic lease payments less said management fee.

11. A method for creating and managing a lease agreement according to claim 3 wherein said step of monitoring periodic lease payment activity includes entering account information regarding said lessee, said lessor, said lease agreement and said service product into a computer; noting dates associated with actual payments and expected payments; designating accounts with payments past due for five days; generating and sending letters to said lessor and said lessee indicating that the full periodic lease payment was not received; and continuing to monitor said account, all performed by said computer.

12. A method for creating and managing a lease agreement according to claim 11 wherein said step of monitoring further includes the steps of determining whether a payment has been received within the ten days following said five days past due date and if payment is received, updating said account to reflect payment received and, if no payment is received, generating and sending a second letter to said lessee; and initiating a collection process.

13. A method for creating and managing a lease agreement according to claim 12 wherein said step of monitoring further includes the step of determining whether payment has been made by a next regular periodic due date, and, if no payment has been received, comparing an amount of outstanding debt to said guaranty limit, and, if said outstanding debt amount exceeds said guaranty limit, crediting an amount equal to said security deposit to said lessor; closing the account, with no further automatic deposits being made; and generating and sending a letter to said lessor indicating said limit has been achieved.

14. A method for creating and managing a lease agreement according to claim 13 wherein said step of monitoring includes the steps of, upon a determination that said limit has not been exceeded and the outstanding debt has not been paid within five days of a regular next periodic due date, assessing by said computer a late fee to said account and generating and sending letters to said lessor and said lessee.

15. A computer-implemented method for creating and managing a rental agreement, said method comprising the steps of:

providing predetermined financial information from a potential tenant to a potential landlord;

providing said predetermined financial information from said potential landlord to a lease control intermediary;

evaluating said predetermined financial information by said lease control intermediary to determine an acceptability of a level of financial risk associated with said potential tenant;

creating, upon determination of an acceptable risk level, a service product in the form of a guaranty directed to rent payments from said lease control intermediary to said potential landlord for a predetermined amount defining a guaranty limit, said guaranty limit corresponding to a predetermined time period with said guaranty obligation becoming active upon failure of said potential tenant to pay rent payments;

providing, upon determination of an acceptable risk level, a lease agreement for execution by said potential landlord, said potential tenant and said lease control intermediary and rent payment material to said tenant directing payment of rent to said lease control intermediary whereby, upon execution of said lease agreement, said potential tenant and said potential landlord become tenant and landlord, and said lease control intermediary becomes a guarantor of the lease payments;

depositing rent payments either received from said tenant or made by said lease control intermediary according to said service product into an account held by said landlord, said rent payments having a management fee removed therefrom by said lease control intermediary.

16. A method for creating and managing a lease agreement according to claim 15 and further comprising the step of entering data relevant to said tenant, said landlord, said lease agreement and said service product into a computer preprogrammed for account control.

17. A method for creating and managing a lease agreement according to claim 16 and further comprising the step, to be performed upon acceptance of said service product by said landlord and said lease agreement by said landlord, said tenant and said lease control intermediary, of monitoring rent payment activity by said tenant using said computer to determine whether rent payment has been made by a predetermined date.

18. A method for creating and managing a lease agreement according to claim 17 wherein said monitoring step includes, upon nonreceipt of said rent payment by said predetermined date, adding uncollected rent payments to a total amount of outstanding debt for an account of said tenant, and comparing said amount of outstanding debt to said predetermined guaranty limit to determine whether said amount of outstanding debt exceeds said predetermined guaranty limit.

19. A method for creating and managing a lease agreement according to claim 18 and further comprising the step of paying said landlord an amount in accordance with said service product and initiating collection procedures to recover the amount of said outstanding debt from said tenant.

20. A method for creating and managing a lease agreement according to claim 18 and further comprising the steps of obtaining a security deposit from said tenant upon execution of said lease agreement and applying the amount of said security deposit to offset any outstanding debt associated with said tenant.

21. A method for creating and managing a lease agreement according to claim 16 wherein the step of evaluating said predetermined financial information includes determining whether more than one potential tenant exists for a proposed lease using said computer and if more than one potential tenant exists, storing said predetermined financial information for all potential tenants by said computer until all potential tenants have submitted said predetermined financial information; comparing said predetermined financial information from all potential tenants to a credit allocation model resident in said computer resulting in a collective credit assessment; determining said guaranty limit based on said collective credit assessment; and preparing said service product with said guaranty limit.

22. A method for creating and managing a lease agreement according to claim 16 wherein said step of evaluating said predetermined financial information includes comparing said predetermined financial information from said potential tenant to a credit allocation model resident in said computer resulting in a credit assessment and determining said guaranty limit based on said credit assessment and preparing said service product with said guaranty limit.

23. A method for creating and managing a lease agreement according to claim 22 and further comprising the steps of determining whether said credit assessment results in declining the applicant, and, if so, issuing a letter from said computer to the said potential tenant indicating that the lease control intermediary has declined to offer a guaranty to said potential landlord.

24. A method for creating and managing a lease agreement according to claim 15 and further comprising the step of electing, by said landlord, whether said rent payments should be directly deposited into a bank account of said landlord, and, if so, said method further includes the step of creating an automatic periodic lease deposit account in a computer, and the step of depositing rent payments includes automatically crediting said automatic periodic lease deposit account with an amount in accordance with said rent payments less said management fee.

25. A method for creating and managing a lease agreement according to claim 17 wherein said step of monitoring rent payment activity includes entering account information regarding said tenant, said landlord, said lease agreement and said service product into a computer; noting dates associated with actual payments and expected payments; designating accounts with payments past due for five days; generating and sending letters to said landlord and said tenant indicating that the full rent payment was not received; and continuing to monitor said account, all performed by said computer.

26. A method for creating and managing a lease agreement according to claim 25 wherein said step of monitoring further includes the steps of determining whether a payment has been received within the ten days following said five days past due date and if payment is received, updating said account to reflect payment received and, if no payment is received, generating and sending a second letter to said tenant; and initiating a collection process.

27. A method for creating and managing a lease agreement according to claim 26 wherein said step of monitoring further includes the step of determining whether payment has been made by a next regular periodic due date, and, if no payment has been received; comparing an amount of outstanding debt to said guaranty limit, and, if said outstanding debt amount exceeds said guaranty limit, crediting an amount equal to said security deposit to said landlord; closing said account with no further automatic deposits being made; and generating and sending a letter to said landlord indicating said limit has been achieved.

28. A method for creating and managing a lease agreement according to claim 27 wherein said step of monitoring includes the steps of, upon a determination that said limit has not been exceeded and the outstanding debt has not been paid within five days of a next regular periodic due date, assessing by said computer a late fee to said account and generating and sending letters to said landlord and said tenant.

29. A computer-implemented method for creating and managing a lease agreement comprising the steps of:

providing predetermined information regarding a potential lesee and a potential lessor to a lease control intermediary;

evaluating said predetermined information by said lease control intermediary to determine an acceptability of a level of financial risk associated with said potential lessee;

creating, upon determination of an acceptable risk level, a service product in the form of a quaranty directed to periodic intermediary lease payments from said lease control intermediary to said potential lessor for a predetermined amount defining a guaranty limit, said guaranty limit corresponding to a predetermined time period with said guaranty obligation becoming active upon failure of said potential lessee to pay periodic lease payments;

providing, upon determination of an acceptable risk level, a lease agreement for execution by said potential lessor, said potential lessee and said lease control intermediary and periodic lease payment material to said potential lessee directing payment of periodic lease payments to said lease control intermediary and defining a regular periodic due date for said periodic lease payments whereby, upon execution of said lease agreement, said potential lessee and said potential lessor become lessee and lessor, and said lease control intermediary becomes a guarantor of said periodic lease payments; and transferring said periodic intermediary lease payments from said lease control intermediary to said lessor, said periodic intermediary lease payments being substantially equivalent to said periodic lease payments less a management fee and each said periodic intermediary lease payment being transferred to said lessor no later than said regular periodic due date.

30. A method for creating and managing a lease agreement according to claim 29 and further comprising the step of entering data relevant to said lessee, said lessor, said lease agreement and said service product into a computer preprogrammed for account control.

31. A method for creating and managing a lease agreement according to claim 30 and further comprising the step, to be performed upon acceptance of said service product by said lessor and said lease agreement by said lessor, said lessee and said lease control intermediary, of monitoring periodic lease payment activity using said computer to determine whether said periodic lease payments are made to said lease control intermediary by said regular periodic due date.

32. A method for creating and managing a lease agreement according to claim 31 wherein said monitoring step includes, upon nonreceipt by said lease control intermediary of said periodic lease payment by said regular periodic due date, adding uncollected periodic lease payments to a total amount of outstanding debt for said lessee, and comparing said amount of outstanding debt to said predetermined guaranty limit to determine whether said amount of outstanding debt exceeds said guaranty limit.

33. A method for creating and managing a lease agreement according to claim 29 and further comprising the step of electing, by said lessor, whether said periodic intermediary lease payments should be directly deposited into a bank account of said lessor, and, if so, said method further includes the step of creating an automatic periodic lease deposit account in a computer and the step of transferring said periodic intermediary lease payments includes automatically crediting said automatic periodic lease deposit account with an amount in accordance with said periodic lease payments less said management fee.

34. A computer-implemented method for creating and managing a rental agreement, said method comprising the steps of:

providing predetermined financial information from a potential tenant to a potential landlord;

transferring said predetermined financial information from said potential landlord to a lease control intermediary;

evaluating said predetermined financial information by said lease control intermediary to determine an acceptability of a level of financial risk associated with said potential tenant;

creating, upon determination of an acceptable risk level, a service product in the form of a guaranty directed to intermediary rent payments from said lease control intermediary to said potential landlord for a predetermined amount defining a guaranty limit, said guaranty limit corresponding to a predetermined time period with said guaranty obligation becoming active upon failure of said potential tenant to pay rent payments;

providing, upon determination of an acceptable risk level, a rental agreement for execution by said potential landlord, said potential tenant and said lease control intermediary and rent payment material to said potential tenant directing payment of rent to said lease control intermediary and defining a regular periodic due date for said rent payments whereby, upon execution of said rental agreement, said potential tenant and said potential landlord become tenant and landlord, and said lease control intermediary becomes a guarantor of said rent payments; and transferring said intermediary rent payments from said lease control intermediary to said landlord, said intermediary rent payments being substantially equivalent to said rent payments less a management fee and each said intermediary rent payment being transferred to said landlord no later than said regular periodic due date.

35. A method for creating and managing a rental agreement according to claim 34 and further comprising the step of entering data relevant to said tenant, said landlord, said lease agreement and said service product into a computer preprogrammed for account control.

36. A method for creating and managing a rental agreement according to claim 35 and further comprising the step, to be performed upon acceptance of said service product by said landlord and said rental agreement by said landlord, said tenant and said lease control intermediary, of monitoring rent payment activity by said tenant using said computer to determine whether rent payment has been made by said regular periodic due date.

37. A method for creating and managing a rental agreement according to claim 36 wherein said monitoring step includes, upon nonreceipt of said rent payment by said regular periodic due date, adding uncollected rent payments to a total amount of outstanding debt for said tenant, and comparing said amount of outstanding debt to said guaranty limit to determine whether said amount of outstanding debt exceeds said guaranty limit.

38. A method for creating and managing a rental agreement according to claim 34 and further comprising the step of electing, by said landlord, whether said rent payments should be directly deposited into a bank account of said landlord, and, if so, said method further includes the step of creating an automatic periodic rent deposit account in a computer, and the step of transferring said intermediary rent payments includes automatically crediting said automatic periodic lease deposit account with an amount in accordance with said rent payments less said management fee.

\* \* \* \* \*

UNITED STATES PATENT AND TRADEMARK OFFICE
CERTIFICATE OF CORRECTION

PATENT NO. : 6,049,784
DATED : April 11, 2000
INVENTOR(S) : Weatherly et al.

It is certified that error appears in the above-identified patent and that said Letters Patent is hereby corrected as shown below:

Cols.

1, Line 19: After 'holdings', delete "often" and insert -of ten-.
4, Line 37: After 'illustrated' insert -18-.

4, Line 53: After 'illustrated at' insert -26-.

5, Line 40: After 'the reports', delete "also referenced at 42".

6, Line 10: After 'illustrated at' delete "60" and insert -62-.
6, Line 48: Delete "58" and insert -52-.
7, Line 54: Delete "10".

UNITED STATES PATENT AND TRADEMARK OFFICE
CERTIFICATE OF CORRECTION

PATENT NO. : 6,049,784
DATED : April 11, 2000
INVENTOR(S) : Weatherly et al.

It is certified that error appears in the above-identified patent and that said Letters Patent is hereby corrected as shown below:

In the Claims:
  8: Line 46: After' said potential' insert -lessor-.
  10, Line 39: After 'five days of a' delete"regular next" and insert -next regular-.

Signed and Sealed this

Sixth Day of March, 2001

Attest:

NICHOLAS P. GODICI

Attesting Officer          Acting Director of the United States Patent and Trademark Office